United States Patent [19]
Georgeff et al.

[11] Patent Number: 6,074,078
[45] Date of Patent: Jun. 13, 2000

[54] LAMP ASSEMBLY WITH FLUID DISPENSING NOZZLE

[75] Inventors: Robert B. Georgeff, Pleasant Ridge; Earl R. Sobeck, Dearborn Height; Albert J. Sherrington, Shelby Township; Waine T. Brock, Troy; Todd H. Wludyka, Walled Lake, all of Mich.

[73] Assignee: DaimlerChrysler Corporation, Auburn Hills, Mich.

[21] Appl. No.: 09/220,483

[22] Filed: Dec. 23, 1998

[51] Int. Cl.⁷ .................................................. B60Q 1/26
[52] U.S. Cl. ........................... 362/503; 362/96; 362/101; 362/541; 222/113; 222/192; 239/284.1
[58] Field of Search ............................... 362/96, 503, 101, 362/541; 222/113, 192; 239/284.1, 284.2

[56] References Cited

U.S. PATENT DOCUMENTS

| | | | |
|---|---|---|---|
| 4,285,470 | 8/1981 | Roth | 239/284.2 |
| 4,368,505 | 1/1983 | Tomforde | 239/284.2 |
| 5,550,718 | 8/1996 | Shy | 362/503 |
| 5,605,286 | 2/1997 | Orth et al. | 239/284.2 |

Primary Examiner—Sandra O'Shea
Assistant Examiner—Ronald E. DelGizzi
Attorney, Agent, or Firm—Jennifer M. Stec

[57] ABSTRACT

A lamp assembly having fluid dispensing capabilities comprising a housing, a lens having a fluid nozzle retaining sleeve and a fluid nozzle assembly. The lamp assembly is subassembled by snap-fitting these components together, installing a lamp unit to the housing and a seal to the lens. Installation of the lamp assembly into the vehicle is accomplished by connecting the lamp unit to a wire harness, coupling the fluid nozzle assembly to a fluid supply line and securing the lamp assembly in an aperture in the vehicle with a pair of fasteners. The lamp assembly is particularly useful when incorporated into a rearward facing surface of a vehicle as the lamp serves as a center high mount stop lamp and the nozzle assembly is used to dispense a cleaning fluid onto a rear windshield.

15 Claims, 2 Drawing Sheets

LAMP ASSEMBLY WITH FLUID DISPENSING NOZZLE

BACKGROUND OF THE INVENTION

1. Technical Field

The present invention relates generally to a vehicle lamp unit and more particularly to a lamp unit having an integral fluid dispensing nozzle.

2. Discussion

Vehicles having large rear windows, particularly mini-vans, are frequently equipped with a wiper and a fluid nozzle for allowing the vehicle operator to periodically dispense a cleaning fluid and actuate the wiper to clean the rear window. These nozzles have previously been incorporated in various positions in either the rear door or a rear surface of the vehicle body. Placement of the nozzle in these positions, however, is attendant with several drawbacks.

One such drawback has been the inclusion of an additional hole in the door or body of the vehicle needed to mount the nozzle. This additional hole increases the tooling and piece costs of these items, as well as provides a path by which water may enter into an unfinished interior compartment within the vehicle door or body in an undetected manner, thereby significantly increasing the potential for corrosion. Other drawbacks include the need for dedicated labor on the vehicle assembly line to install the nozzle, as well as the negative impact on the overall appearance of the vehicle.

As the nozzle assembly is frequently positioned in close proximity to the center high mount stop lamp (CHMSL) or other light source, it would be particularly advantageous to incorporate a fluid dispensing nozzle assembly into a lamp assembly to thereby eliminate the above mentioned drawbacks. Therefore, there remains a need in the art for a lamp assembly having a fluid nozzle assembly for dispensing a fluid.

SUMMARY OF THE INVENTION

It is therefore one object of the present invention to provide a lamp assembly having a fluid nozzle assembly for dispensing fluid.

It is another object of the present invention to provide a lamp assembly having a fluid nozzle assembly for dispensing fluid for use in conjunction with a rearward facing surface of a vehicle.

It is a further object of the present invention to provide a lamp assembly having a fluid nozzle assembly which minimizes the tooling and piece costs of the vehicle body.

It is yet another object of the present invention to provide a lamp assembly having a fluid nozzle assembly which eliminates a significant amount of assembly labor required for installation of the fluid nozzle assembly into the vehicle.

The lamp assembly of the present invention is comprised of a housing, a lens having a fluid nozzle retaining sleeve and a fluid nozzle assembly. The lamp assembly is subassembled by snap-fitting these components together, installing a lamp unit to the housing and a seal to the lens. Installation of the lamp assembly into the vehicle is accomplished by connecting the lamp unit to a wire harness, coupling the fluid nozzle assembly to a fluid supply line and securing the lamp assembly in an aperture in the vehicle with a pair of fasteners.

As only one aperture is needed for both the light and the fluid nozzle, tooling and piece costs are therefore reduced. Labor on the vehicle assembly line is also reduced as the need to install a separate fluid nozzle assembly is eliminated.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
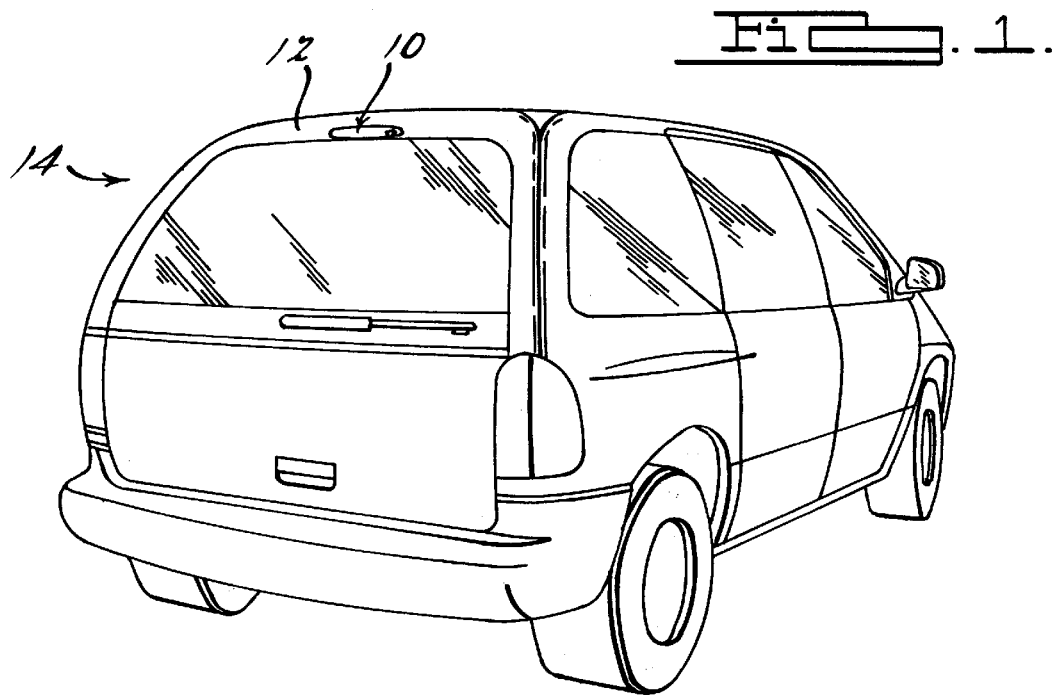
FIG. 1 is a perspective view of a mini-van equipped with a center high mounted stop light constructed in accordance with teachings of the present invention.
Figure 2:
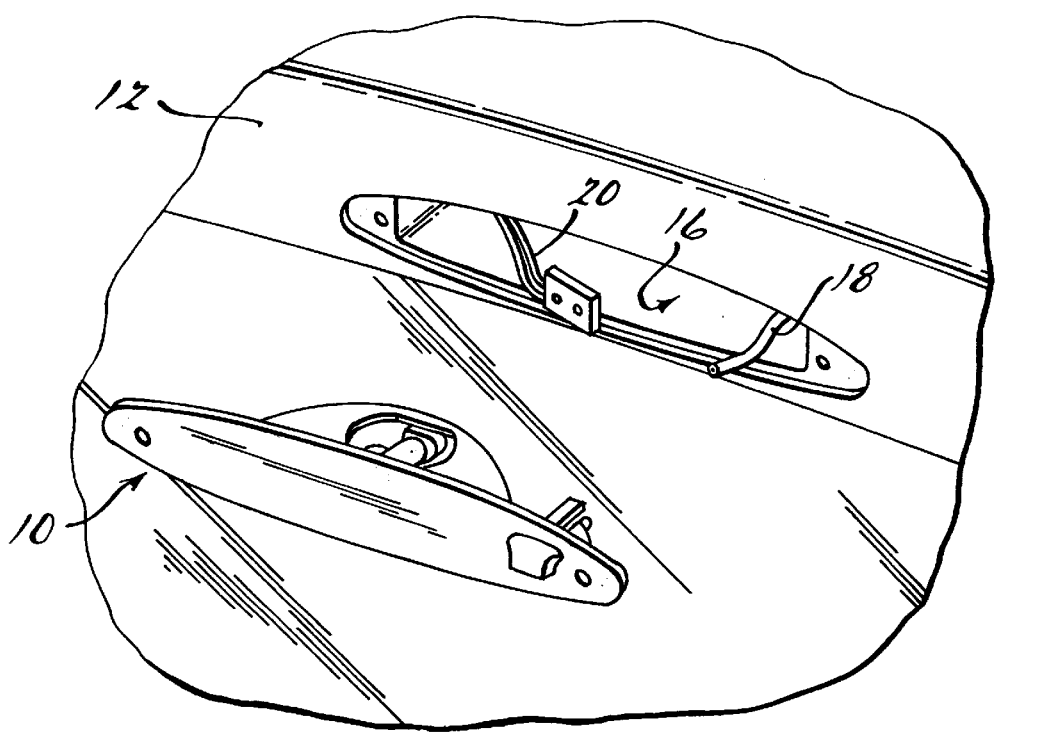
FIG. 2 is an exploded perspective view of a portion of the mini-van shown in FIG. 1.
Figure 3:
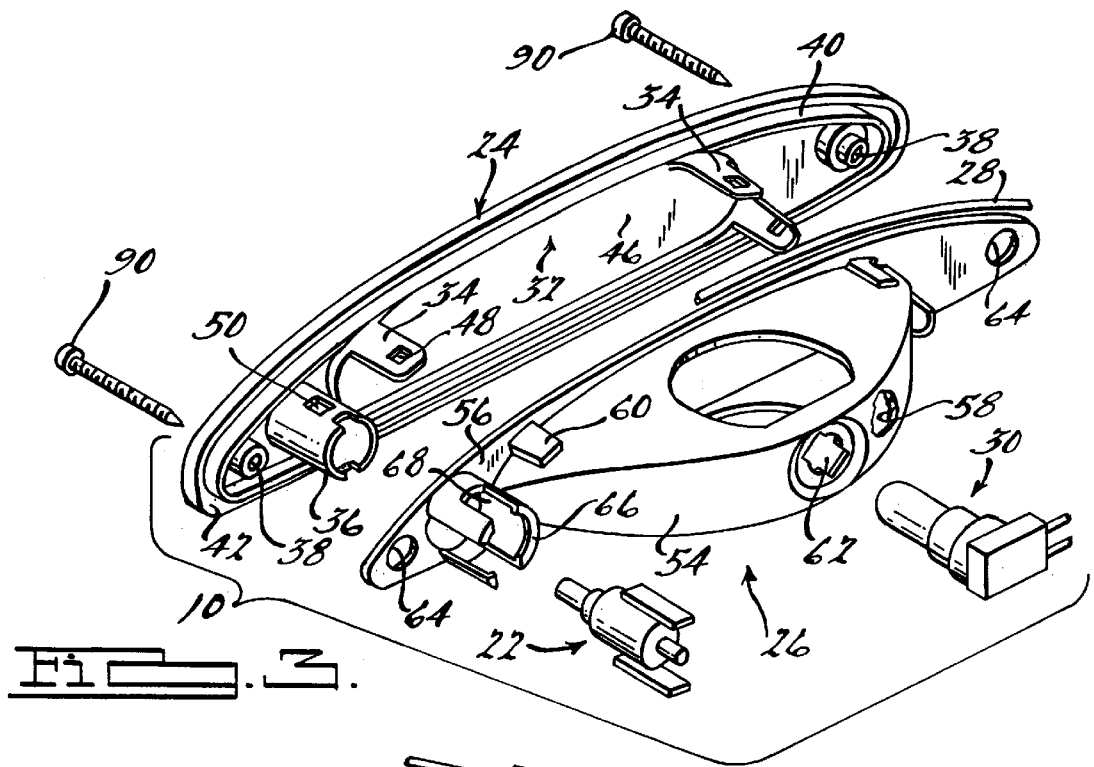
FIG. 3 is an exploded perspective view of the lamp assembly of the present invention.
Figure 4:
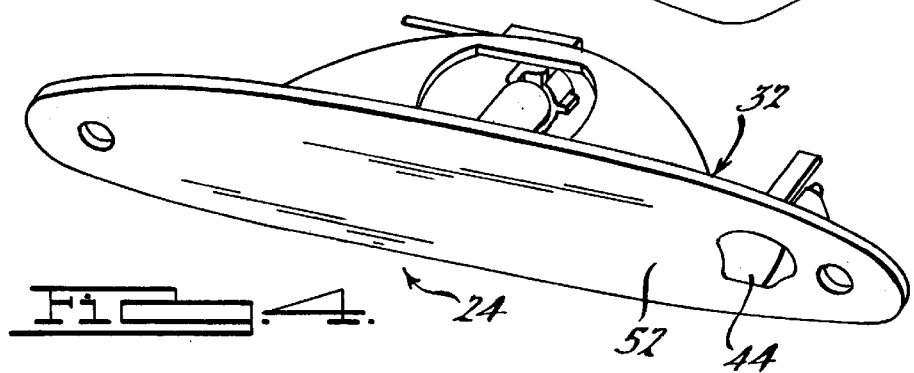
FIG. 4 is a front perspective view of the lamp assembly of the present invention.

Referring to the drawings wherein like reference numerals designate corresponding parts though out the Figures, the combination center high mount stop lamp (CHMSL) of the present invention is indicated generally by reference numeral 10 and is shown in FIGS. 1 and 2 as mounted to a confronting surface 12 located on the upper rear body portion of a vehicle, such as a mini-van 14. Confronting surface 12 is shown to include recessed aperture 16 which houses a portion of combination CHMSL 10 as well as a fluid supply line 18 and a wire harness 20. Referring to FIGS. 3 and 4, combination CHMSL 10 is shown to include a nozzle assembly 22, a lens 24, a housing 26, a lens-to-body seal 28 (partly shown) and a lamp unit 30.

Lens 24 includes a lens portion 32, a plurality of lens retaining tabs 34, a retaining sleeve 36, a pair of mounting apertures 38, a diffuser 40, a perimeter shoulder 42 and a nozzle hood 44. In the embodiment shown, lens 24 is preferably unitarily formed from a nylon material such as GRILAMID TR-90 Red L97437-15 Nylon commercially available from EMS-Chemie North America. However, lens 24 may also be constructed from polycarbonate which is subsequently hardcoated to improve its chemical resistance. Lens portion 32 is red in color and designed to meet the Federal Department of Transportation requirements for high mounted stop lamps.

Lens retaining tabs 34 extend away from the interior surface 46 of lens 24 and include retaining lugs 48 which are operable for snap-connecting lens 24 to housing 26. Retaining sleeve 36 is a generally cylindrically shaped, hollow structure which extends away from interior surface 46. Retaining sleeve 36 is sized to house nozzle assembly 22 and includes a pair of retaining slots 50 which are operable for securing lens 24 and nozzle assembly 22 together. While nozzle assembly 22 may alternatively be coupled to housing 26, coupling lens 24 and nozzle assembly 22 together minimizes concerns over tolerance stack-up, and maintains the spatial relationship between nozzle assembly 22 and confronting surface 12.

Diffuser 40 is configured to minimize the transmission of stray light from exiting combination CHMSL 10 at any point other than through lens portion 32. Diffuser 40 and perimeter shoulder 42 are operable for maintaining the position of retaining lens-to-body seal 28 within a predetermined area.

Lens-to-body seal 28 is a "foam in place" gasket which prevents the transmission of light from the combination CHMSL 10 around its perimeter. Lens-to-body seal 28 also prevents water or fluids from entering into combination CHMSL 10 or mini-van 14 around the perimeter of lens 24. Nozzle hood 44 is molded into the exterior surface 52 of lens 24 and is included to improve the appearance of combination CHMSL 10 as well as to prevent nozzle assembly 22 from being damaged (e.g., during the unloading of articles from the roof of mini-van 14).

Housing 26 is unitarily formed, for example, from a high-impact molded plastic and includes a hood portion 54 and a flange portion 56. Hood portion 54 includes an interior parabolically curved surface 58, a plurality of lens tab retaining apertures 60 and a lamp unit mounting aperture 62 which is conventionally designed to receive and retain lamp unit 30. Preferably, curved surface 58 includes a reflective coating, such as a painted or vacu-metalized deposit, so as to concentrate and direct the light produced by lamp unit 30 towards lens portion 32. Flange portion 56 includes a pair of lens apertures 64 and an integrated nozzle sleeve 66 for protecting the nozzle assembly 22 during installation of the combination CHMSL 10 into mini-van 14. Integrated nozzle sleeve 66 is generally cylindrically shaped with a hollow interior and includes a pair of slotted apertures 68 which allow nozzle assembly 22 to be coupled directly to retaining sleeve 36.

Figure 5:
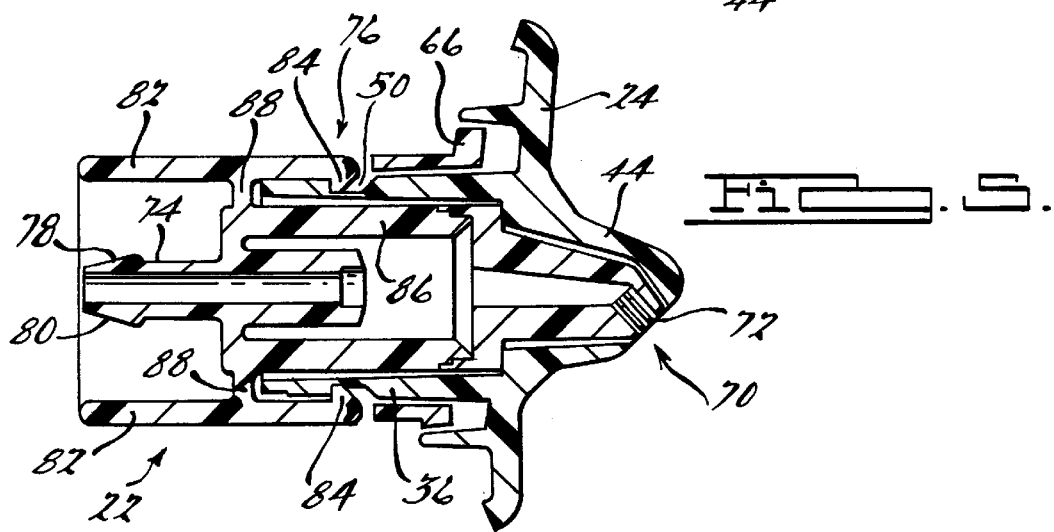
FIG. 5 is a section view of lamp assembly taken through the center of the nozzle assembly.

With reference to FIG. 5, nozzle assembly 22 is shown to include a directional spray tip 70 having a plurality of fluid dispensing apertures 72, a fluid supply conduit 74 and a connecting means 76 for coupling nozzle assembly 22 to lens 24. Fluid supply conduit 74 includes a fluid line securing means 78 for coupling a fluid supply line 18 to nozzle assembly 22. In the embodiment shown, fluid line securing means 78 is a hose barb 80 formed into an end of fluid supply conduit 74. Coupling fluid supply line 18 to fluid supply conduit 74 in this manner can be performed efficiently and is entirely satisfactory for supplying low-pressure fluids to nozzle assembly 22. Connecting means 76 is shown be a conventional snap-fastener arrangement which includes a pair of retaining tongs 82, each having a retaining fork 84, which are coupled to the body 86 of nozzle assembly 22 through a resilient pillar 88.

The material and size of pillar 88 are configured to allow nozzle assembly 22 to be pressed into retaining sleeve 36, causing retaining tongs 82 to pivot about their respective pillar 88 and spread apart during contact with retaining sleeve 36. After nozzle assembly 22 is installed into retaining sleeve 36 to a predetermined dimension, the resilient characteristic of pillar 88 causes retaining forks 84 to pivot into their respective retaining slots 50, thereby retaining nozzle assembly 22 within retaining sleeve 36.

Combination CHMSL 10 is subassembled by first positioning lens 24 relative to housing 26, engaging retaining tabs 34 into lens tab retaining apertures 60 and forcing lens 24 against housing 26 so as to cause the engagement of retaining lugs 48 housing in a know snap-fit manner. Lamp unit 30 is then inserted into lamp unit mounting aperture 62 and rotated so as to retain it within housing 26 in a known manner. Nozzle assembly 22 is next installed into retaining sleeve 36 and coupled to lens 24 in the manner described above. The subassembly operation is then completed by installing lens-to-body seal 28 to lens 24. Installation of combination CHMSL 10 is accomplished by attaching wire harness 20 to lamp unit 30 in a conventional manner, attaching fluid supply line 18 to supply line connecting means 76, placing combination CHMSL 10 into recessed aperture 16 and securing it to mini-van 14 with fasteners 90.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed:

1. A fluid dispensing lamp assembly for a vehicle comprising:
   a housing having a hood portion;
   a lamp unit removably coupled to said hood portion and providing a source of light;
   a lens coupled to said housing and covering said hood portion; and
   a fluid nozzle assembly coupled to at least one of said housing and said lens and operable for dispensing a fluid to a portion of an exterior surface of said vehicle.

2. The lamp assembly of claim 1 wherein said hood portion includes a parabolically formed interior surface.

3. The lamp assembly of claim 2 wherein said interior surface includes a reflective coating.

4. The lamp assembly of claim 3 wherein said reflective coating is a vacu-metalized deposit.

5. The lamp assembly of claim 3 wherein said reflective coating is a painted deposit.

6. The lamp assembly of claim 1 wherein said lens is formed from nylon.

7. The lamp assembly of claim 1 wherein said lens is formed from polycarbonate.

8. A fluid-dispensing stop lamp assembly in combination with a vehicle, the stop lamp assembly comprising:
   a housing having a hood portion;
   a lamp unit removably coupled to said hood portion and providing a source of light;
   a lens coupled to said housing and covering said hood portion;
   a fluid nozzle assembly coupled to at least one of said housing and said lens and operable for dispensing a fluid to a portion of an exterior surface of said vehicle;
   said stop lamp assembly operably mounted to a rearward facing exterior surface of said vehicle.

9. The lamp assembly of claim 8 wherein said hood portion includes a parabolically formed interior surface.

10. The lamp assembly of claim 9 wherein said interior surface includes a reflective coating.

11. The lamp assembly of claim 10 wherein said reflective coating is a vacu-metalized deposit.

12. The lamp assembly of claim 10 wherein said reflective coating is a painted deposit.

13. The lamp assembly of claim 8 wherein said lens is formed from nylon.

14. The lamp assembly of claim 8 wherein said lens is formed from polycarbonate.

15. A fluid-dispensing stop lamp assembly for a vehicle comprising:
   a housing having a hood portion and a flange portion, said hood portion having a parabolically shaped reflective interior surface, a plurality of lens tab retaining apertures and a lamp unit retaining aperture, and said flange portion having a nozzle sleeve;

a lamp unit for providing a source of light, said lamp unit disposed within said lamp unit retaining aperture and removably coupled to said hood portion;

a lens having a red colored lens portion, a plurality of lens retaining tabs for engaging said lens tab retaining apertures and a retaining sleeve having a retaining slot; and a fluid nozzle assembly coupled to said lens and operable for dispensing a fluid to a portion of an exterior surface of said vehicle, said nozzle assembly including a directional spray tip having a fluid dispensing aperture;

wherein said stop lamp assembly is adapted to be mounted to a rearward facing exterior surface of said vehicle.

* * * * *